United States Patent [19]

Hoch et al.

[11] 4,150,732

[45] Apr. 24, 1979

[54] RESONANT CAVITY DEVICES FOR REDUCING NOISE WITHIN A DUCT IN THE PRESENCE OF A GASEOUS FLUID

[75] Inventors: Rene G. Hoch, La Rochette; Bernard J. L. Jubelin, Cesson; Pierre M. A. Sarlat, Fontainebleau; Pierre Thomas, La Houssaye en Brie, all of France

[73] Assignee: Societe Nationale d'Etude et de Construction de Moteurs d'Aviation, Paris, France

[21] Appl. No.: 866,796

[22] Filed: Jan. 3, 1978

[30] Foreign Application Priority Data

Jan. 11, 1977 [FR] France .............................. 77 01142

[51] Int. Cl.² .............................................. F01N 1/02
[52] U.S. Cl. ................................... 181/213; 181/286; 181/292; 181/293
[58] Field of Search ............................... 181/217–219, 181/222, 224, 284, 285, 286, 287, 288, 281, 290–293, 213, 275; 428/73, 116, 119, 120, 131

[56] References Cited

U.S. PATENT DOCUMENTS

| | | | |
|---|---|---|---|
| 2,765,044 | 10/1956 | Hatte | 181/275 |
| 3,269,484 | 8/1966 | Lighter | 181/290 |
| 3,437,173 | 4/1969 | Ehrich | 181/213 |
| 3,819,007 | 6/1974 | Wirt et al. | 181/286 |
| 3,819,009 | 6/1974 | Motsinger | 181/292 |
| 4,100,993 | 7/1978 | Feder | 181/213 |

FOREIGN PATENT DOCUMENTS

| | | | |
|---|---|---|---|
| 131432 | 4/1951 | Denmark | 181/293 |
| 904984 | 1/1954 | Fed. Rep. of Germany. | |
| 1235540 | 12/1960 | France | 293/ |
| 1307183 | 9/1962 | France. | |
| 1372478 | 10/1964 | France. | |
| 858049 | 1/1961 | United Kingdom | 181/290 |

*Primary Examiner*—Stephen J. Tomsky
*Assistant Examiner*—Benjamin R. Fuller
*Attorney, Agent, or Firm*—Bacon & Thomas

[57] ABSTRACT

A sound insulation chamber delimits a gaseous flow channel and including resonant cavities housed within a double wall. The cavity vents are ducts which open into the channel flush with the inner wall and project into the interior of the cavities.

14 Claims, 5 Drawing Figures

RESONANT CAVITY DEVICES FOR REDUCING NOISE WITHIN A DUCT IN THE PRESENCE OF A GASEOUS FLUID

BACKGROUND OF THE INVENTION

The invention pertains to annular chambers having two coaxial shells, wherein the inner shell delimits a channel traversed by a gaseous flow and the space between the two shells is divided by means of partitions into distinct cavities which communicate with the flow channel through openings or vents, each volume thus acting as a Helmholtz resonator which absorbs a portion of the acoustical energy in a given frequency band. Such chambers are notably used as housing walls in jet engines—such as turbojets—where numerous sources of noise are present together, including the combustion chamber and the blades of the compressor and turbine stages.

Such chambers are already known. They are of two kinds. In some of them, the cavities communicate directly with the channel by means of openings or slits provided in the inner shell. In other words, the opening of each resonator is a simple diaphragm, and the most important frequency tuning parameter that can be varied is the volume of each cavity. In the others, the vent is a duct. In order to change the absorption frequency and bandwidth, one may then more sensibly adjust its length and cross-sectional area. Nevertheless, even for chambers of the latter kind, there is the risk of being led to a significant lateral bulk if one attempts to tune to low frequencies; moreover, their construction is complex. See for example U.S. Pat. No. 2,765,044.

SUMMARY OF THE INVENTION

The object of the invention is an annular chamber belonging to the second category mentioned above, but which simultaneously offers the following advantages in comparison with known chambers:
 simplicity of construction;
 small lateral bulk;
 large variety of possible shapes of resonant cavities and vents and consequent ease of adaptation, without significant modification, to numerous applications.

The chamber according to the invention is generally characterized by the fact that each resonator opening or vent opens into the corresponding cavity through a duct which is joined to the inner shell, penetrates into the interior of the said cavity, and opens into the channel flush with the inner wall of the said shell.

The volume of said duct thus lies entirely within the volume of the corresponding cavity and results in saving the length of said conduit from the lateral bulk; in view of the ratio of the volumes of the duct and of the cavity, the elevation of the tuning frequency resulting from this arrangement because of the reduced cavity volume being very small and, if appropriate, can be completely compensated for by adjusting one of the numerous other parameters of the acoustical system achieved in this manner.

In a particularly advantageous form of achievement, as to simplicity of construction, the cavities are obtained by dividing the volume enclosed between the shells by means of partitions oriented transversly (that is, arranged perpendicularly or obliquely) to the direction of the flow; the openings of the ducts into the channel consist of slits provided in the inner shell and are substantially parallel to the partitions; the ducts are delimited within the cavities by pairs of lips which are parallel or inclined with respect to each other. It can be seen that these arrangements make it possible to obtain highly varied configurations in a very simple manner, since at least a portion of one lip of each pair of lips can consist of a portion of a partition or of the inner or outer shell. Moreover, the possibility of changing the distance between the lips of a pair, or the inclination of one lip with respect to the other, permits easy adjustment of the acoustic resistance of ducts.

It should be made clear that the term "shell", as used in this description, can mean a series of shell sections. As for the slits, they may be continuous or discontinuous.

Other arrangements and their consequences will become evident in the following description of examples of embodiments of the chamber according to the invention, with reference to the appendied drawings, wherein:

BRIEF DESCRIPTION OF THE PREFERRED EMBODIMENTS

The components or parts depicted in these figures bear similar numerical references whenever their functions are the same, but the reference numbers are accompanied by different letters when the form or location of such components differ.

Figure 1:
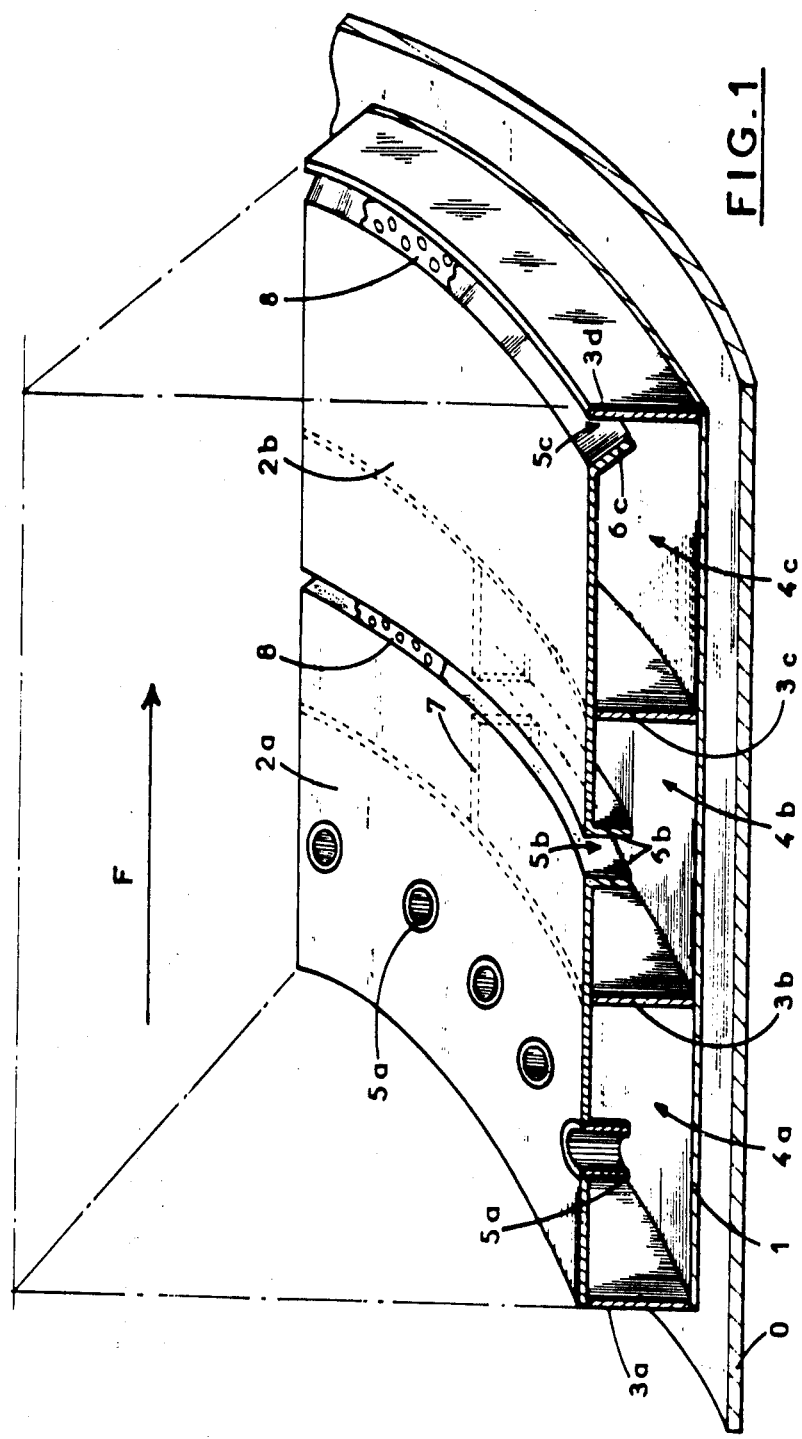
FIG. 1 is a partial perspective axial section of a machine housing whose wall bears a chamber according to the invention; the said figure shows three embodiments of the cavities and vents of said chamber.

FIG. 1 is considered first. The outer shell 1 of the chamber according to the invention is secured to the inner wall 0 of the housing of the apparatus (nozzle, turbine or compressor stage, combustion chamber) for which it is wished to provide sound insulation, which is traversed by a gaseous current F. Said inner wall 0 may also constitute the outer shell 1 of the chamber according to the invention. The inner shell consists of a series of sections 2a, 2b, etc. Ring-shaped transverse partitions 3a, 3b, 3c, 3d, etc. are secured at their outer periphery to the inner wall of the outer shell 1 and by their inner circumference to a portion of the sections 2 they support. They thus delimit cavities 4a, 4b, 4c, etc. between the outer shell 1 and the sections 2a, 2b, etc.

FIG. 1 shows three possible ways of achieving vents for the resonators consisting of the cavities 4. Cavity 4a communicates with the central flow channel by means of tubes 5a which are flush with the inner surface of inner shell section 2a and penetrate into said cavity. The resonance frequency of cavity 4a thus depends primarily on the volume of said cavity, as well as on the number, inside diameter and length of the tubes 5a.

The vent of cavity 4b consists of a slit 5b which separates sections 2a and 2b and projects into the cavity 4b by means of lips 6b which form an annular opening whose length and depth, together with the internal volume of the cavity 4b, determine resonance frequency of the latter. As in the other examples of vent resonators which will be described later, it should be noted that the division of cavity 4b by partitions such as 7 whose projection onto sections 2a and 2b is shown by dashed lines, and which can be aligned in either an axial or an oblique plane does not substantially change the resonance frequency as long as the cross-sectional area of the vent is not too large.

The resonance frequency of a Helmholtz resonator is effectively given by the relationship:

$$W_O = C(S/l'V)^{\frac{1}{2}}/2\pi,$$

where $W_O$ is the first partial (or fundamental) frequency, C is the speed of sound in the fluid, S is the cross-sectional area of the vent, l' is its corrected length, and V is the volume of the cavity.

The separation by partitions such as partition 7 divides the quantities S and V in the same ratio.

The vent of cavity 4c is delimited by slit 5c, which is in turn delimited by partition 3d and by a ring-shaped lip 6c secured to the extremity of section 4c [i.e. 2b] near partition 3d.

Furthermore, in order to achieve acoustic resistances which provide the best maximum attenuation or which widen the passband of the slit cavities at the expense of damping the resonance, it is possible to partially close off 5b and 5c (and, similarly, the vents of the other embodiments to be described later) by means of perforated strips, such as those whose fragments 8 are shown. It may then be advantageous to provide slits with lips which are not parallel but rather inclined with respect to each other in such a fashion that the section of said slit will be larger at the level of the inner shell than at its exit into the cavity (as shown, for slit 5c, in the right-hand portion of FIG. 1).

Figure 2:
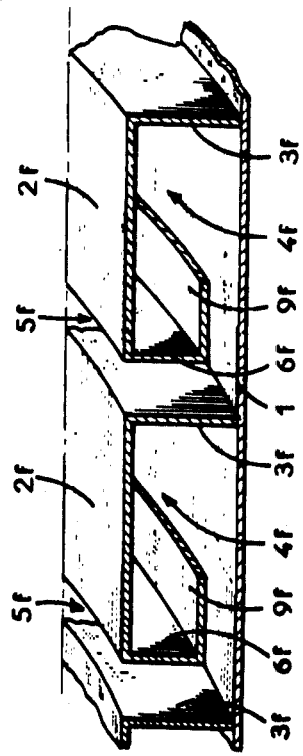
FIGS. 2, 3, 4 and 5 are respectively partial perspective axial sections of chambers according to the invention, each showing a particular embodiment.

FIG. 2 is considered next. As in the succeeding figures, the wall 0 (FIG. 1) of the housing of the apparatus to be provided with sound insulation is not shown. Each cavity 4e is delimited by the outer shell 1, inner shell sections 2e and partitions 3e. Each vent, opening through a slit 5e provided between the extremity of a section 2e and a lip 6e which is joined to said partition 3e and may or may not be parallel to said section 2e. This arrangement allows the vents to have a maximum length almost equal to the spacing between the partitions, if necessary.

Figure 3:
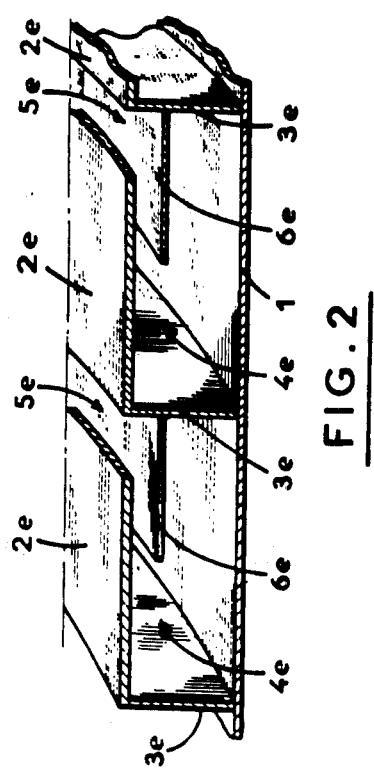
Figure 4:
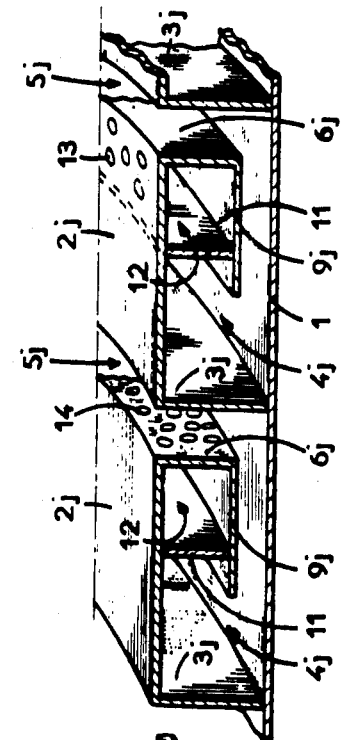

The arrangement depicted in FIG. 3 makes it possible to increase even further the length of each vent which opens, as in FIG. 4, by means of a slit 5f provided between a first inner shell section 2f and a partition 3f which supports the end of a second, neighboring such section 2f. Each vent is delimited first by said partition 3f and by a lip 6f which may or may not be parallel to said partition and is joined to the first section 2f. It then continues through a passage delimited by the outer shell 1 and by a lip 9f which is joined to lip 6f and may or may not be parallel to said shell 1.

The arrangement shown in FIG. 4 provides the same possibility, but each partition 3g supports a section 2g at its mid section. A double slit 5g–5h is obtained by inserting a partition 10 between each pair of consecutive ends of sections 2g. Moreover, the partitions 10 are not always necessary. Each vent consists in fact of two ducts, one of which is provided between a partition 10 and a lip 6g or 6h which may or may not be parallel to said partition and which is joined to one end of a section 2g, while the other is provided between the shell 1 and a lip 9g or 9h which may or may not be parallel to said shell and which is joined to lip 6g or 6h.

Figure 5:
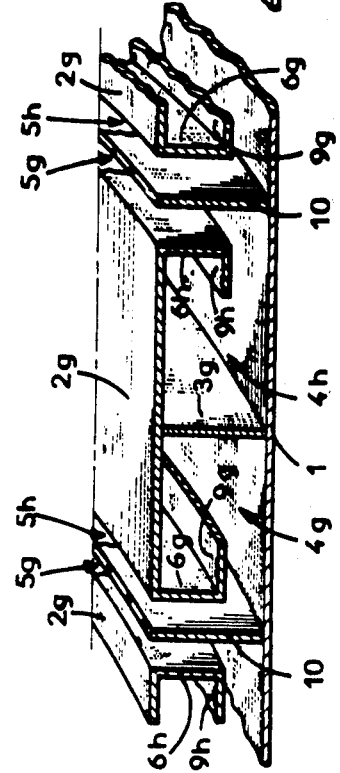

Finally, FIG. 5 shows a last configuration example, wherein the arrangement of sections 2j, partitions 3j and lips 6j and 9j is identical, other than for symmetry, to the arrangement of the parts bearing the same reference numbers in FIG. 3. But, in addition, supplementary partitions 11 parallel to lip 6j join each lip 9j to the corresponding section 2j and delimit a secondary resonant cavity 12 within each resonant cavity 4j. The vents of each cavity 12 consist, for example, of openings 14 provided in the corresponding lip 6j or openings 13 provided in the corresponding section 2j.

The examples described above are but a few of the possibilities afforded by the invention. They are sufficient, nevertheless, to show that there is great freedom in the choice of parameters such as the shape, dimensions and number of the resonant cavities, shape and dimensions of the vents, insertion of acoustical resistances, etc., and that the invention also permits solving very many problems of providing sound insulation in rotating machines herein the term "bent duct" is employed to refer to a passageway for sound comprising at least two legs or branches arranged at an angle to each other. For example, in FIG. 2, the bent duct comprises a first leg perpendicular to the elements 2e and a second leg defined between 2e and 6e. In FIG. 3, the bent duct has a first leg defined by partition 3f and lip 6f and a second leg defined by 9f and 1. In FIG. 4, the first leg is defined by, for example, 6h and 10 and the second leg by 9h and 1. In FIG. 5, the first leg would be between 6j and 3j and the second leg between 9j and 1.

An advantage of the invention which has not been mentioned to this point is the great ease of making the device.

For example, the chamber may be made in sectors, such as those of FIG. 1. Shell element 1 is initially a flat panel onto which are brazed flats which will constitute the partitions 3. The shell section sectors 2 also are flat panels whose opposite ends are bent so as to form the lips 6. The panels 2 are subsequently brazed onto the partitions 3 and the entire assembly is then cambered to the desired curvature.

This mode of construction, which is no more than an example and which can be subjected to numerous variations, is applicable to all of the examples given in this description.

We claim:

1. A chamber for attenuating the acoustical energy propagating within a channel traversed by a gaseoue flow, comprising two substantially coaxial shells, wherein the inner wall of the inner shell delimits the flow channel, the space between the two shells being divided by partitions which separate independent annular cavities each of which communicates with the channel through at least one opening provided in the inner shell, and said cavities thus forming annular acoustic resonators which attenuate, in a given frequency range, the acoustical energy propagating in the channel, said chamber being characterized by the fact that each opening opens into the corresponding cavity through a bent duct having two angularly related branches which extend into the interior of said cavity, one of said branches being joined to the inner shell and opening into the channel flush with said inner wall, and the other of its branches extending substantially parallel to the axis of the channel and opening into said cavities.

2. A chamber according to claim 1, characterized by the fact that the partitions which separate the cavities are arranged transverse to the direction of gas flow, that the openings consist of slits provided in the inner shell and substantially parallel to said partitions, and that the ducts are bounded within the cavities by pairs of lips.

3. A chamber according to claim 2, characterized by the fact that the two lips that bound each duct are parallel to each other.

4. A chamber according to claim 2, characterized by the fact that the two lips that bound each duct are inclined with respect to each other in such a fashion that the cross-sectional area of the duct is larger at the level of the inner shell than at its exit into the cavity.

5. A chamber according to claim 3, characterized by the fact that at least one portion of one of the lips of at least one pair of lips consists of a portion of a partition.

6. A chamber according to claim 5, characterized by the fact that at least a portion of the surface of at least one of the individual lips of the partitions is perforated by a multiplicity of openings.

7. A chamber according to claim 3, characterized by the fact that both lips of at least one pair of lips are distinct from the partitions.

8. A chamber according to claim 3, characterized by the fact that at least a portion of one of the lips of at least one pair of lips consists of a portion of the inner shell.

9. A chamber according to claim 3, characterized by the fact that at least one portion of one of the lips of at least one pair of lips consists of a portion of the outer shell.

10. A chamber according to claim 9, characterized by the fact that at least one supplementary partition joining at least one lip distinct from the outer shell to the inner shell delimits a secondary cavity within the corresponding cavity.

11. A chamber according to claim 10, characterized by the fact that the secondary cavity communicates with the flow channel through openings provided in the inner shell portion which bounds it.

12. A chamber according to claim 10, characterized by the fact that the secondary cavity communicates with the adjacent duct through apertures provided in the lip section which bounds it.

13. A chamber according to claim 3, characterized by the fact that at least one slit is partially closed off by a perforated strip.

14. A chamber according to claim 1, characterized by the fact that at least one annular cavity is divided into at least two sectoral cavities by at least two partitions aligned transverse to its walls.

* * * * *